US011359724B2

(12) United States Patent
Wagner

(10) Patent No.: US 11,359,724 B2
(45) Date of Patent: Jun. 14, 2022

(54) CONTAMINATION EXCLUSION FOR SEAL RING WITH CONDUCTIVE NONWOVEN FIBER

(71) Applicant: Freudenberg-NOK General Partnership, Plymouth, MI (US)

(72) Inventor: Richard Wagner, Helen, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 94 days.

(21) Appl. No.: 16/711,876

(22) Filed: Dec. 12, 2019

(65) Prior Publication Data

US 2021/0180698 A1    Jun. 17, 2021

(51) Int. Cl.
*F16J 15/3204* (2016.01)

(52) U.S. Cl.
CPC ................. *F16J 15/3204* (2013.01)

(58) Field of Classification Search
CPC .......... F16J 15/00; F16J 15/32; F16J 15/3204; F16J 15/3208; F16J 15/3216; F16J 15/322; F16J 15/3232; F16J 15/3236; F16J 15/16; F16J 15/50; F16J 15/52
USPC ....................................................... 277/549
See application file for complete search history.

(56) References Cited

U.S. PATENT DOCUMENTS

| | | | | |
|---|---|---|---|---|
| 4,623,153 A | * | 11/1986 | Nagasawa | F16J 15/3232 277/551 |
| 4,822,059 A | * | 4/1989 | Shimasaki | F16J 15/3232 277/564 |
| 6,315,296 B1 | | 11/2001 | Oldenburg | |
| 7,086,275 B2 | * | 8/2006 | Bock | G01M 3/183 73/40 |
| 10,161,522 B2 | | 12/2018 | Colineau et al. | |
| 2004/0232619 A1 | | 11/2004 | Bock | |
| 2014/0203514 A1 | * | 7/2014 | Colineau | F16J 15/3232 277/353 |
| 2018/0313449 A1 | | 11/2018 | Dahlhaus-Preussler et al. | |

FOREIGN PATENT DOCUMENTS

WO    2008/120399 A1    10/2008

OTHER PUBLICATIONS

Extended European Search Report dated Mar. 31, 2021 (correpsonding to EP20203775.0).

* cited by examiner

*Primary Examiner* — Nathan Cumar
(74) *Attorney, Agent, or Firm* — Harness, Dickey & Pierce, P.L.C.

(57) ABSTRACT

A sealing assembly including a housing including a bore and a shaft rotatably disposed in the bore. A primary radial shaft seal is secured to the housing and includes a sealing lip engaging the shaft. A buffer seal made of an electrically conductive non-woven fabric which is arranged adjacent to the primary radial shaft seal and in contact with the housing and the shaft. A secondary contaminant exclusion seal is secured to the housing and includes at least one dust lip. The buffer seal is sandwiched between the primary radial shaft seal and the secondary contaminant exclusion seal.

8 Claims, 1 Drawing Sheet

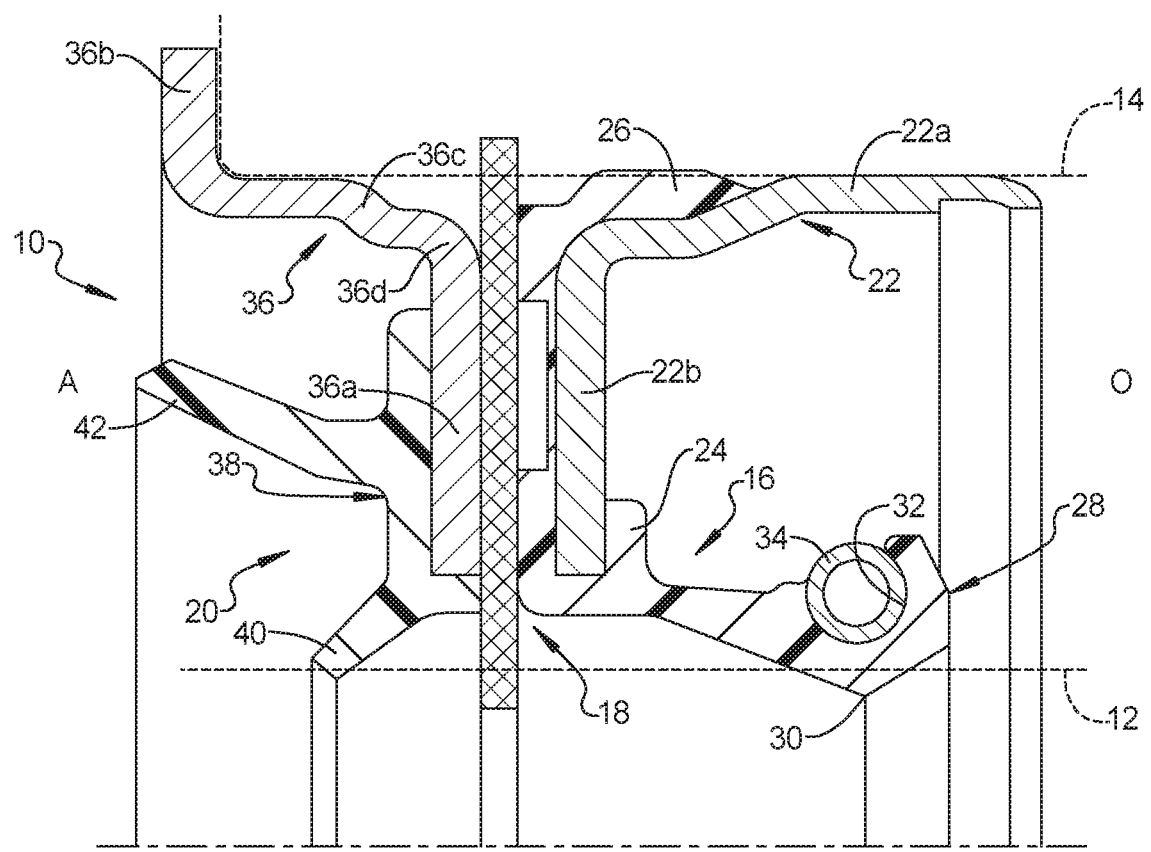

CONTAMINATION EXCLUSION FOR SEAL RING WITH CONDUCTIVE NONWOVEN FIBER

FIELD

The present disclosure relates to a sealing system comprising a contamination exclusion seal for a radial shaft seal ring and a buffer seal made from a conductive nonwoven fiber.

BACKGROUND

This section provides background information related to the present disclosure which is not necessarily prior art.

Radial shaft seals are generally known in the art. The radial shaft seal includes a sealing lip which faces the medium to be sealed in an axial direction. The problem addressed by the present disclosure is that of further developing a seal assembly in such a way that an electrostatic charge and damage to the machine elements to be sealed off from one another as a result of said electrostatic charge are prevented by the seal assembly.

SUMMARY

This section provides a general summary of the disclosure, and is not a comprehensive disclosure of its full scope or all of its features.

The present disclosure provides a sealing assembly including a housing including a bore and a shaft rotatably disposed in the bore. A primary radial shaft seal is secured to the housing and includes a sealing lip engaging the shaft. A buffer seal made of an electrically conductive non-woven fabric is arranged adjacent to the primary radial shaft seal and in contact with the housing and the shaft. A secondary contaminant exclusion seal is secured to the housing and includes at least one dust lip. The buffer seal is sandwiched between the primary radial shaft seal and the secondary contaminant exclusion seal.

In this connection, it is advantageous that the machine elements that are to be sealed off from one another by the sealing assembly are connected to one another in electrically conductive fashion owing to the electrical conductivity of the buffer seal. An equalization of electric potential between the machine elements is thereby effected. As a result, mechanical damage and electromagnetic interference resulting from an electrostatic charge of one of the machine elements is prevented.

In the seal assembly, one of the machine elements is grounded to a specific ground potential (for example, to the body of a motor vehicle as the electric ground potential), so that a potential equalization to the other machine element is produced by the electrically conductive buffer seal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE is a cross-sectional view of a seal assembly having a radial shaft seal combined with a conductive nonwoven fiber buffer seal and a secondary contamination exclusion seal according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

With reference to the FIGURE, the seal assembly 10 is shown for sealing a gap between a first machine element 12 and a second machine element 14. The first machine element 12 can include a driveshaft of, for example, an electric motor. The second machine element 14 can include a housing of an electric motor or a transmission connected to the electric motor.

The seal assembly includes a primary radial shaft seal 16, a conductive nonwoven fiber buffer seal 18, and a secondary contaminant exclusion seal 20. The primary radial shaft seal 16 includes a support element 22, that can include a metal retainer, and an elastomeric seal body 24 molded to the support element 22. The support element 22 includes an axially extending portion 22a that is seated within the bore of the housing 14, and a radially inwardly extending portion 22b that supports the primary radial shaft seal 16. Although the elastomeric seal body 24 can take on many forms, the seal body 24 as shown includes a static sealing portion 26 engaging the second machine element 14 and a dynamic sealing portion 28 that can include a seal lip 30 that engages the first machine element 12. The dynamic sealing portion 28 can further include a recessed annular groove 32 for receiving an optional annular garter spring 34.

The conductive nonwoven fiber buffer seal 18 can be made from a copper-nickel impregnated nonwoven carbon fiber material. The conductive nonwoven fiber buffer seal 18 can be in a form of a circular disc with a center hole and extends from a surface of the first machine element 12 to a surface of the second machine element 14. The conductive nonwoven fiber buffer seal 18 is sandwiched between the primary radial shaft seal 16 and the secondary contaminant exclusion seal 20. The conductive nonwoven fiber buffer seal 18 provides high abrasion resistance paired with low friction and high electrical conductivity. The conductive nonwoven fiber buffer seal 18 provides electromagnetic shielding to reduce radio interference and reduces the risk of mechanical damage due to dielectric charge.

The secondary contaminant exclusion seal 20 can include a support element 36, that can include a metal retainer, and an elastomeric seal body 38 molded to a radially inwardly extending flange 36a of the support element 36. Although the elastomeric seal body 38 can take on many forms, the seal body 38 as shown includes a dynamic sealing portion that can include a radial dust lip 40 and an axial dust lip 42. The secondary contaminant exclusion seal 20 is placed on the air side (A) of the conductive nonwoven fiber buffer seal 18 and expels water and dust to prevent degradation of the conductive nonwoven fiber buffer seal 18 and the primary radial shaft seal 16. The support element 36 includes a radially outwardly extending flange 36b that provides a positive stop during assembly into the housing 14 and an axially extending intermediate portion 36c that is seated within the bore of the housing 14. The support element 36 includes a radially inwardly extending portion 36d that provides a relief for the conductive nonwoven fiber buffer seal 18 after it is installed into the housing 14.

The primary radial shaft seal 16 can be installed into the housing first, followed by the conductive nonwoven fiber buffer seal 18 and the secondary contaminant exclusion seal 20. As an alternative, the secondary contaminant exclusion seal 20 can be attached to the conductive nonwoven fiber buffer seal 18, which is attached to the primary radial shaft seal 16 and the assembly can be installed in one operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing assembly for sealing a gap between a housing and a shaft, comprising:
    a primary radial shaft seal having a first support element adapted to be non-rotatably secured directly to the housing and including a sealing lip adapted to engage the shaft;
    a buffer seal made of an electrically conductive nonwoven fabric which is arranged adjacent to the primary radial shaft seal and adapted to directly contact the housing and the shaft, wherein the buffer seal is in a shape of a circular disc with a center opening; and
    a secondary contaminant exclusion seal having a second support element adapted to be non-rotatably secured directly to the housing and including at least one dust lip, wherein the buffer seal is sandwiched directly between and directly adjacent to the primary radial shaft seal and the secondary contaminant exclusion seal.

2. The sealing assembly according to claim 1, wherein the sealing lip is made of an elastomeric material.

3. The sealing assembly according to claim 1, wherein the at least one dust lip of the secondary contaminant exclusion seal includes a first radial dust lip and a second axial dust lip.

4. The sealing assembly according to claim 1, wherein the dust lip is made of an elastomeric material.

5. A sealing assembly, comprising:
    a housing including a bore;
    a shaft rotatably disposed in the bore;
    a primary radial shaft seal having a first support element secured directly to the housing and including a sealing lip engaging the shaft;
    a buffer seal made of an electrically conductive nonwoven fabric which is arranged adjacent to the primary radial shaft seal and directly in contact with the housing and the shaft, wherein the buffer seal is in a shape of a circular disc with a center opening; and
    a secondary contaminant exclusion seal having a second support element secured directly to the housing and including at least one dust lip, wherein the buffer seal is sandwiched directly between and directly adjacent to the primary radial shaft seal and the secondary contaminant exclusion seal.

6. The sealing assembly according to claim 5, wherein the sealing lip is made of an elastomeric material.

7. The sealing assembly according to claim 5, wherein the at least one dust lip of the secondary contaminant exclusion seal includes a first radial dust lip and a second axial dust lip.

8. The sealing assembly according to claim 5, wherein the dust lip is made of an elastomeric material.

* * * * *